(12) United States Patent
Guo

(10) Patent No.: US 9,551,586 B2
(45) Date of Patent: Jan. 24, 2017

(54) SYSTEM AND METHOD FOR PROVIDING CONTEXTUAL INFORMATION FOR A LOCATION

(71) Applicant: Uber Technologies, Inc., San Francisco, CA (US)

(72) Inventor: Fei Guo, Sunnyvale, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

(21) Appl. No.: 14/738,698

(22) Filed: Jun. 12, 2015

(65) Prior Publication Data

US 2016/0363458 A1  Dec. 15, 2016

(51) Int. Cl.
*H04L 29/08* (2006.01)
*G01C 21/36* (2006.01)

(52) U.S. Cl.
CPC ............. *G01C 21/36* (2013.01); *H04L 67/18* (2013.01)

(58) Field of Classification Search
CPC combination set(s) only.
See application file for complete search history.

(56) References Cited

U.S. PATENT DOCUMENTS

| | | | |
|---|---|---|---|
| 6,587,782 B1 | 7/2003 | Nocek et al. | |
| 7,606,663 B2 | 10/2009 | Neef | |
| 8,538,956 B1 | 9/2013 | Szabadka | |
| 8,902,260 B2 | 12/2014 | Kuhne | |
| 2002/0054082 A1 | 5/2002 | Karpf | |
| 2009/0113296 A1 | 4/2009 | Lacy et al. | |
| 2009/0156241 A1 | 6/2009 | Staffaroni et al. | |
| 2009/0171939 A1* | 7/2009 | Athsani | G06F 17/30241 |
| 2009/0222482 A1* | 9/2009 | Klassen | G06F 17/30241 |
| 2010/0253542 A1* | 10/2010 | Seder | G01S 7/22 340/932.2 |
| 2010/0317368 A1 | 12/2010 | Augst et al. | |
| 2011/0052042 A1* | 3/2011 | Ben Tzvi | G06T 19/006 382/154 |
| 2011/0081919 A1 | 4/2011 | Das et al. | |
| 2012/0041675 A1 | 2/2012 | Juliver | |
| 2012/0158445 A1 | 6/2012 | Dufford | |
| 2013/0072226 A1 | 3/2013 | Thramann | |
| 2013/0096813 A1* | 4/2013 | Geffner | H04W 4/003 701/117 |
| 2013/0139044 A1 | 5/2013 | Iversen | |
| 2013/0174076 A1 | 7/2013 | Geelen | |

(Continued)

FOREIGN PATENT DOCUMENTS

WO  WO 2011-067741  6/2011

OTHER PUBLICATIONS

International Search Report dated Jan. 7, 2015.
International Search Report and Written Opinion in PCT/US2016/037088 dated Aug. 24, 2016.

*Primary Examiner* — Thomas Tarcza
*Assistant Examiner* — Edward J Pipala
(74) *Attorney, Agent, or Firm* — Mahamedi IP Law LLP

(57) ABSTRACT

A contextual description of the arrival location can be determined based on individual or combined attributes, which include (i) a text-based identifier of one or more of the multiple places, and (ii) a spatial relationship as between one or more of the places, or as between the multiple places and the arrival location. The contextual description can be provided for a navigation interface of a computing device used by the user.

20 Claims, 5 Drawing Sheets

(56) References Cited

U.S. PATENT DOCUMENTS

| | | |
|---|---|---|
| 2013/0196692 A1 | 8/2013 | Huang et al. |
| 2013/0232169 A1 | 9/2013 | Gill et al. |
| 2014/0012909 A1* | 1/2014 | Sankar .................. G06Q 50/01 709/204 |
| 2014/0067901 A1* | 3/2014 | Shaw ..................... G06Q 10/10 709/201 |

* cited by examiner

SYSTEM AND METHOD FOR PROVIDING CONTEXTUAL INFORMATION FOR A LOCATION

BACKGROUND

For any arbitrary location on the map (e.g., given a latitude and longitude coordinate), a typical reverse geocoding operation returns an address for the location. This is the typical reverse geocoding address.

DETAILED DESCRIPTION

Figure 1:
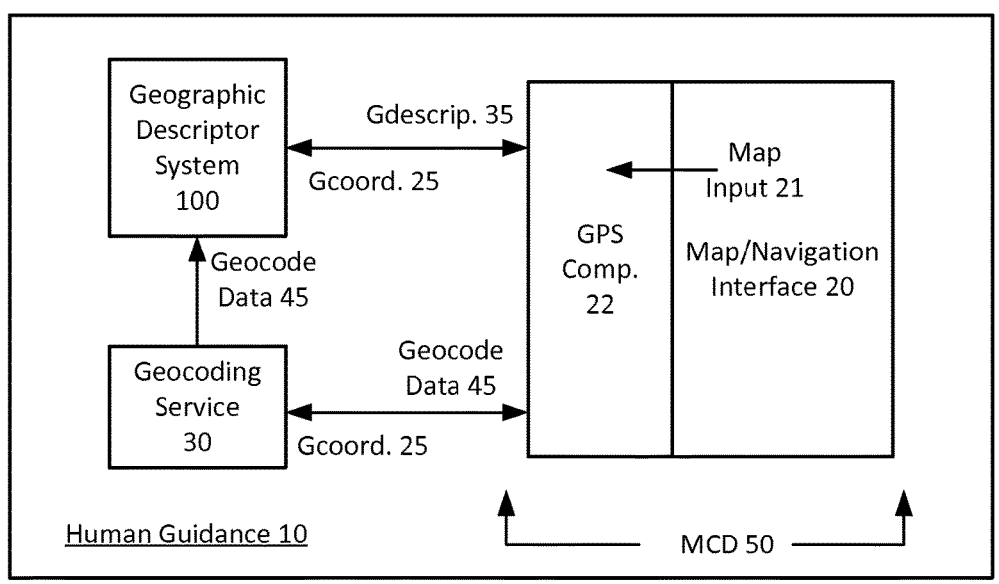
FIG. 1 illustrates a human guidance system which includes functionality for providing contextual geographic descriptors for human consumption, according to one or more embodiments.

According to examples described herein, a computer system and service operate to receive or determine a location of arrival, which can be in the form of geographic coordinates (e.g., longitude and latitude), as determined from a Global Positioning System (GPS) device. The computer system or service operates to select multiple places that are within a proximity threshold with respect to the arrival location based on the geographic coordinates of the arrival location. From the multiple places, the computer system or service determines multiple contextual attributes of the arrival location. A contextual description of the arrival location can be determined based on individual or combined attributes, which include (i) a text-based identifier of one or more of the multiple places, and (ii) a spatial relationship as between one or more of the places, or as between the multiple places and the arrival location. The contextual description can be provided for a navigation interface of a computing device used by the user.

Generally, conventional navigation and mapping systems display urban location information to the user in the context of either a street address or a map location (e.g., pin on map). Geocoding services exist which can translate geographic coordinates (e.g., longitude and latitude), such as provided from Global Positioning System (GPS) components, into street addresses or map locations.

Among other benefits, examples such as described herein enable contextual descriptions to serve as an alternative to a typical street address identification or map-based identifiers. Examples recognize that in many urban environments, a street address is difficult for humans to comprehend for recall or visual identification on arrival. In one example scenario, transport providers sometimes suggest a pickup location for a passenger other than the passenger's current location (e.g., because of ordinance, traffic, etc.). In such a scenario, the passenger may need to walk to the arrival location, and the street address can be a difficult way to communicate the arrival location for the passenger, even when a navigation or map interface is used. In another example scenario, a driver or transport provider can field or accept a request for transport. Under many conventional approaches, the driver may receive a street address or a point on a map. In urban environments, the driver may have a difficult time associating the pickup location with information he may know regarding the region, such as ease of access to the region, or ability to pull over and pick up the rider.

Humans often convey information location information to other humans in a manner that conveys context. However, human knowledge is often limited with respect to a geographic location. For example, while a human can naturally provide contextual information when telling a visitor how to arrive at his current location or to his home, humans have limited ability to describe more than a few locations they know well. Moreover, the human description is often personalized based on factors that affect the person's perception. For example, a human may describe a given location by describing a large sign which is visible from the advantage point where he is standing. This description lacks objectivity, and may not be the optimal description for others. For example, the large signage can be visible but across the street from a meeting location, meaning additional description would be needed to orient another human to stand at the desired meeting location (e.g., meeting location) on the block.

Examples such as described include a computer system and service in which a contextual mufti-attribute description is used to identify an arrival location. Such description represents an enhancement or improvement over geocoding and/or map-based pinning because the descriptors provide geographic context which are often omitted under the conventional approaches. Moreover, the descriptors are based on multiple attributes, such as intersection name and nearest buildings, to improve human comprehension, such as visualization, visual identification (e.g., when human is on the scene), and recall. Such descriptors can be generated to cover locations that span a geographic region, and further can be generated based on objective criteria, such as distance measurements (e.g., nearest or proximity thresholds). In these and other regards, examples such as described differ from conventional practice, as well as human practice. Examples such as described also provide technical effect, in that descriptors can be generated to enhance human perception and understanding, thus enhancing efficiency of a computer-implemented navigation or mapping system which utilizes descriptors generated through examples as described.

According to some examples, the computer system or service that provides contextual multi-attribute descriptions can be a part of or can be in communication with a service arrangement system. As described herein, a service arrangement system enables a user (or requester or rider) to operate a designated client application on the user's mobile computing device (e.g., a client device) to make a request for a location-based service, such as a transport service. The service arrangement system can arrange the transport service to be provided for the user by selecting a service provider, e.g., a driver, to transport the user from one location to another. The user can specify a pickup location or an arrival location, for example, by providing input on the designated client application. In some examples, when the user specifies the arrival location on the designated client application, the service can determine a contextual description for that location and provide the contextual description to the user's device (and/or also to the selected driver's computing device).

As used herein, a client device, a driver device, and/or a computing device refer to devices corresponding to desktop computers, cellular devices or smartphones, personal digital assistants (PDAs), laptop computers, tablet devices, television (IP Television), etc., that can provide network connectivity and processing resources for communicating with the system over a network. A driver device can also correspond to a device of a transit object, such as an on-board computing system or custom hardware, etc. The client device and/or the driver device can also operate a designated application configured to communicate with the computer system and/or the service arrangement system.

Still further, while some examples described herein relate to arrival locations for transport services, the system can enable other on-demand location-based services (for example, a food truck service, a delivery service, an entertainment service) to be arranged between individuals and service providers. For example, a user can request an on-demand service, such as a delivery service (e.g., food delivery, messenger service, food truck service, or product shipping) or an entertainment service (e.g., mariachi band, string quartet) using the service arrangement system, and the system can select a service provider, such as a driver, food provider, band, etc., to provide the on-demand service for the user.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates a human guidance system which includes functionality for providing contextual geographic descriptors for human consumption, according to one or more embodiments. In an example of FIG. 1, a human guidance system 10 can be implemented using any one of a variety of computing environments or platforms, and further in connection with various purposes or other functionality. In some examples, human guidance system 10 can include distributed and independent components which combine to provide geographic information of different kinds to the user. In an example of FIG. 1, human guidance system 10 includes functionality which is distributed between local and network computing environments. The local computing environment can be implemented on an end-user device, shown as mobile computing device 50. By way of example, the mobile computing device 50 can include a cellular telephony voice and messaging device, such as a feature phone or smartphone. In variations, the mobile computing device 50 can be implemented using alternative form factors, such as computing apparel (e.g., smart watch), tablet, or portable laptop. The mobile computing device 50 can also execute applications and application-level functionality, such as provided by the map and navigation interface 20 (also referred to as map/navigation interface 20). Furthermore, the mobile computing device 50 may include various types of sensors, as well position detection components such as an auxiliary or integrated GPS component 22.

The human guidance system 10 can be implemented for different network or location-based services and applications. Among other uses, the human guidance system 10 can be used in context of transport arrangement services, where, for example, a pickup location can serve as the arrival location. As another example, the human guidance system 10 can be used in context of a social network service, such as a "meetup" application in which individuals who share an interest arrive at a common location.

The mobile computing device 50 can operate to determine map content via the map/navigation interface 20. In one implementation, the map/navigation interface 20 can provide a human or event interface which provides for the generation of triggers, shown as map input 21. The map input 21 can be converted on the mobile computing device 50 to geographic coordinates (e.g., latitude and longitude) using GPS component 22. For example, a user can operate the mobile computing device 50 to provide map input 21 on a displayed map content to specify an arrival location. In some implementations, the mobile computing device 50 can use remote network services to retrieve network functionality and content.

In an example of FIG. 1, the mobile computing device 50 can access a geocoding service 30, over one or more networks, in order to provide a map interface (generated from execution of the map/navigation interface 20) with street address, points of interest (e.g., business names, landmarks) and/or metadata object descriptors or other information. The mobile computing device 50 can communicate geographic coordinates 25 in order to receive geocode data 45. In some implementations, the geocode data 45 can provide text or metadata to populate a map interface provided with the mobile computing device 50. The geographic coordinates 25 and geocode data 45 can enable reversible queries, meaning use of geographic coordinates 25 to procure geocode data 45 (e.g., street address) from geocoding service 30 can be reversed so that geocode data 45 can be used to obtain geographic coordinates 25 from the GPS component 22.

Additionally, the mobile computing device 50 can access a geographic descriptor system 100 in order to obtain a contextual geographic phrase description 35. The contextual geographic phrase description 35 can be determined from geographic coordinates 25 and/or from geocode data 45, depending on implementation. The geographic coordinates 25 can provide a human understandable contextual description of an arrival location, sufficient for purposes of (i) enabling a person who approaches the arrival location to estimate the arrival location on a given block or roadway segment, and/or (ii) facilitating mental recall or visualization of a location. As described with other examples, the contextual geographic phrase description 35 can include a combination of contextual attributes and semantics. The contextual attributes can include block identification, intersection identification, buildings, and points-on-interest (e.g., business names, mailboxes, etc.) individually or in combination with other attributes. The contextual attributes can also include spatial descriptors, including qualitative descriptors (e.g., "middle" or "near) and quantitative descriptors (e.g., "50 yards"). In some implementations, the geocode data 45 is generated as a sentence, phrase, or combination of phrases (or sentences) which combine to locate an arrival location for the user.

The human guidance system 10 can be provided with or as part of a transport service that provides or arranges transport services, such as people transportation, package delivery or on-demand delivery of mobile services. In an example of FIG. 1, the geographic descriptor system 100 can be implemented as a network service which communicates with mobile computing devices ("MCD 50") that are carried by users and drivers when drivers are available for providing transport services. The drivers of the transport system can correspond to users whom have the non-exclusive role of serving as a driver of a vehicle (e.g., their own vehicle).

In one usage example, a user can request a transport service, which can include physical transportation of the user, receiving or sending packages or other goods, arranging a service at a particular location on-demand, etc. While in many scenarios, the user can specify his or her current location as the pickup location, situations arise where the pickup location is different from the current location. For example, the user may need to walk 1-2 blocks in a city to arrive at the pickup location. Such situations may arise when, for example, the user's current location is not suitable for a pickup location (e.g., because of traffic laws or event driven). In such scenarios, the transport arrangement service or the driver can suggest the pickup location based on proximity of the user and/or other parameters for location suitability.

As another usage scenario, a provider of an on-demand service can receive a communication from the service as to whether the individual is available to meet the customer at a pickup location. For example, the provider can be a driver waiting for a transport request. When the transport request is received, the driver makes an immediate determination of whether to accept the transport request. Examples recognize that many times, the driver's willingness to accept the ride depends on their familiarity the pickup location. The driver familiarity provides an example of street location recall, which can be better facilitated with geographic descriptors. The driver can more quickly and better form the mental image of the arrival location based on the geographic descriptor, rather than the street address or viewing a map.

As another example, two or more individuals can agree to meet at a particular location, identified by a "pin" on a map. In urban environments, the positioning of a pin on a map interface can itself be visually difficult to discern or view, particularly when the user is operating a mobile computing device with a small screen. Moreover, in many urban sittings, the street address is difficult to see, particularly from the street. Examples as described generate geographic contextual descriptors which can facilitate the individual to identify a given arrival location on sight, without use of street address.

Figure 2:
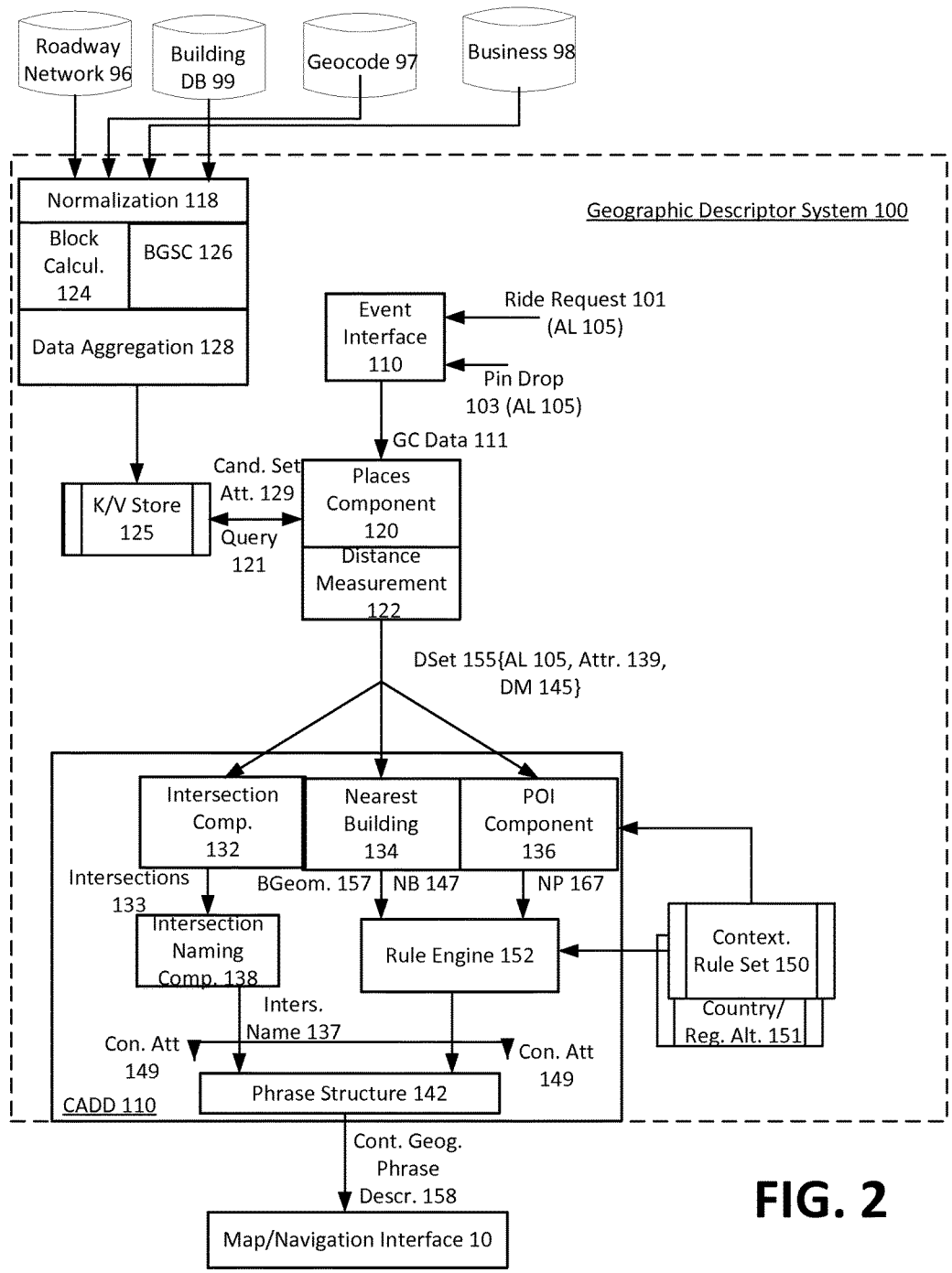
FIG. 2 illustrates a contextual geographic descriptor system, in accordance with one or more embodiments.

FIG. 2 illustrates a contextual geographic descriptor system, in accordance with one or more embodiments. A geographic descriptor system 100 as described with an example of FIG. 2 can be implemented using a variety of different computing platforms and environments. By way of example, the geographic descriptor system 100 can be provided as a network service which can operate with or as part of another service, such as a transport arrangement service or a geocoding service. In variations, the geographic descriptor system 100 can be implemented in a distributed computing environment, such as on a shared platform between an end-user device and a network service. Still further, the geographic descriptor system 100 can be implemented using local resources of a user computer system, such as a user mobile computing device.

With further reference to an example of FIG. 2, the geographic descriptor system 100 can include event interface 110, places component 120, and contextual attribute determination descriptor ("CADD 130"). The event interface 110 represents functionality that is triggered by an event for which a geographic contextual description is generated. In an example of FIG. 4, event interface 110 is responsive to either ride request 101 and/or a pin drop 103. As referred to herein, a pin drop 103 can correspond to input being provided by a user of the mobile computing device to specify a particular location on a map. The ride request 101 or pin drop 103 can represent communications of either the mobile computing device of the user or from a transport arrangement service which may operate independently of geographic descriptor system 100. The ride request 101 and/or pin drop 103 may specify an arrival location 105, such as a pickup location for a rider. The arrival location 105 can be specified by geographic coordinate data such as provided by a GPS resource (e.g., GPS component 22) of the end user's mobile computing device. In some variations, ride request 101 and/or pin drop 103 may include or correspond to a street address, such as provided by geocoding service. The event interface 110 can forward the geographic coordinate data geographic coordinate data 111 (or street address in some variations) of the arrival location 105 to places component 120.

The places component 120 can generate a query 121 for the K/V store 125 (e.g., a key/value store). The K/V store 125 represents one or more tables or other data structures that (i) identify city blocks and intersections, and associate the blocks and intersections with geographic coordinates; (ii) identify buildings and their respective geometries, and associate the buildings with geographic coordinates; and (iii) associates places (e.g., business names, post office boxes, bus stops or other visually distinctive attributes are markers of a particular location) with geographic coordinates.

According to one implementation, the K/V store 125 can be developed from a data aggregation subsystem 128. The data aggregation subsystem 128 includes functional components that access multiple data sources in order to develop geographic data for multiple types of geographic attributes (e.g., city blocks, intersections, buildings, places, etc.). In an example of FIG. 1, the data aggregation subsystem 128 includes a normalization component 118, a block calculation component 124, and a building geometry and space component ("BGSC") 126. The data aggregation subsystem 128 can implement retrieval processes on data sources that include road network 96, geocoding services 97 which map businesses or places to geographic coordinates, business directories 98 (e.g., Yellow Pages), and/or building database 99. Different sets of data sources may be used for different geographic regions (e.g., countries, states or localities). The information which is retrieved from the data sources 96-99 can be disparate, particularly amongst different countries or geographic regions. The information determined about the intersections, buildings, and places can include pinpoint geographic coordinates, such as may be determined from geocoding services 97. The normalization component 118 can implement operations to format and/or convert raw information for block calculation component 124 and BGSC 126 into a normalized structure and format. The block calculation component 124 operates to define city blocks in urban regions. For example, the block calculation component 124 can operate to define individual city blocks by intersections or other geographic descriptors. The BGSC 126 can operate to define perimeters, height, and other aspects of buildings with sufficient granularity to enable subsequent identification of places which may be visible or within the particular building.

The places component 120 sends the query 121 to the K/V store 125 in order to obtain a set of candidate attributes 129, with each candidate attribute corresponding to one of a block, intersection (or intersection pair defining a block), building, and/or place of interest. The query 121 can include the geographic coordinate data 111 of the arrival location 105. Optionally, the query 121 of the places component 120 can also specify criteria that correspond to a distance threshold from the geographic coordinate data 111 of the arrival location. In a variation, the data aggregation subsystem 128 includes an interface that automatically implements a distance threshold for geographic coordinate data 111. The result of the query 121 is that each attribute of the candidate set of attributes 129 is within a distance threshold of the arrival location 105.

The places component 120 can include or otherwise operate a conjunction with a distance measurement component 122, which computes a distance measurement 145 as between each attribute of the set of attributes 129 and the arrival location 105. The distance measurement component 122 can also calculate a distance measurement 145 as between select attributes of the candidate set of attributes 129.

In an example of FIG. 1, the CADD 130 receives, as input, the arrival location 105 paired with attributes of the candidate set of attributes 129, as well as distance measurements 145 with respect to attributes and/or the arrival location 105. In one implementation, a dataset 155 can be provided to CADD 130 as input, with specific parameters which correspond to (i) arrival location 105 as identified by both geographic coordinates geographic coordinate data 111 and street address, (ii) individual attributes 139 of the candidate set 129 as identified by name (e.g., business name) or category (e.g., bus stop), (iii) geographic coordinates and street address of each attribute, and (iv) calculated distance measurements 145 as between attributes (e.g., intersection, place, building) and the arrival location 105 and as between select attributes (e.g., places and buildings of the candidate set 129).

According to an example of FIG. 1, the CADD 130 includes intersection component 132, nearest building component 134, and place of interest component 136. Each of the intersection component 132, nearest building component 134, and place of interest component 136 represents logic or functionality for selecting attributes of the candidate set 129 as contextual attributes 149. More specifically, contextual attributes 149 includes a subset of representative attributes of the candidates set 129 which are selected for inclusion in a phrase description 158 of CADD 130. The contextual attributes 149 can be determined or configured in part using a contextual rule set 150 that specifies configurations or selection parameters for different types of contextual attributes 149. As described below, the contextual rule set 150 can be selected for specific parameters, such as location or geographic region. Thus, country or locality specific alternative rule sets 151 can also be used. With reference to an example of FIG. 2, the contextual rule set 150 can be implemented by a rule engine 152, which represents logic or functionality that can be included with the processes and functionality of CADD 130.

In some implementations, intersection component 132 uses data set 155 to define a city block that contains the arrival location 105. The definition of the city block can include intersections which are identified as boundaries by way of proximity, and/or which are otherwise relevant to the arrival location 105 for other characteristics such as road size and traffic. In one implementation, the nearest intersection to an arrival location 105 is determined using distance measurements 145 as between intersections and the arrival location 105. In some variations, the intersection component 132 ignores the intersections that may be nearest, based on a determination that the nearest intersection is not relevant as compared to another intersection (e.g., a small intersection that may not be well known can be ignored in favor of a large intersection). The selection of which intersections to use in defining a city block can be based in part on threshold parameters (e.g., size of roadway forming intersection, amount of traffic on intersection, presence of traffic light or streetlight, etc.). Both implementation of the rule and the threshold parameters can be configured for specific regions or countries. The intersection component 132 can output one or more intersections 133 which are deemed to define the city block that contains the arrival location 105.

In some variations, the CADD 130 includes an intersection naming component 138 which determines a suitable intersection name 137 for each of the identified intersections 133. The intersection naming component 138 can generate an intersection name 137 using a rule based approach, with specific rules for implementing naming convention that conforms to geographic region or locality. By way of example, an intersection with two streets in a U.S. city can take on the distinctive name portion of each street. In the U.S., the rules for ignoring the distinctive name portion can exclude geographic designators which can be included in the street name as a prefix (e.g., "south", "north", "east" and "west"), as well as in the last word (e.g., "Drive", "Lane", "Road" etc.). Many intersections, particularly in certain countries or regions of the world, have more than two intersecting roadways, and the determination of which roadways to use can follow a rule-based approach, using selection rules which can be stored with the contextual rule set 150. In one implementation, the contextual rule set 150 can specify a rule that names an intersection 133 as being the nearest two roadways of the intersection with respect to the arrival location 105. Thus, distance measurements 145 between the arrival location 105 and the intersections of the data set 155 can serve as a mechanism to generate the intersection name 137. In turn, the intersection name 137 can correspond to one of a determined set of contextual attributes 149 for the arrival location 105.

The nearest building component 134 can use the data set 155 to identify a nearest building 147 to the arrival location 105. In determining the nearest building, both distance measurement 145 and building geometric data 157 can be used as a mechanism for determining a human understandable unit of measurement, such as feet, yards or meters. The building geometric data 157 in particular can serve to identify the nearest building in the way a relevant observer would see the building when at the arrival location 105 (e.g., pedestrian on sidewalk, driver in car on roadway). For example, if the arrival location 105 is situated in between or near two buildings, one of which is short and another which is several stories tall, the building geometric data 157 can identify the respective heights and enable selection of the taller building, which is the better visual marker. Likewise, the building geometric data 157 can indicate when the nearest building is inset from a roadway of the arrival location 105, making another building more proximate in actual distance. Such distinctions would not be apparent using conventional approaches, such as geocoding services, which provide street addresses rather than true distance formulations.

The place of interest component 136 can use a dataset to identify one or more places 167 that are nearest to the arrival location 105 as another type of contextual attribute 149. The nearest places 167 can correspond to businesses, geographic landmarks, or urban infrastructure features which are visually apparent and noteworthy to an observer. Examples of urban infrastructure features include, but are not limited to, bus stops, public signage, and mailboxes.

The contextual rule set 150 can be used to structure the identified contextual attributes 149 (e.g., intersection name 137 (for block containing arrival location 105), nearest building 147, nearest places 167, etc.) into a phrase structure which includes additional contextual attributes 149 that define spatial relations as between the places and/or arrival location. In one implementation, each of the nearest places 167 can be measured in distance against the nearest building 147, as well as geocode information such as address, in order to determine whether each of the nearest places is situated inside the nearest building 147. The contextual rule set 150 can define a spatial relationship and/or naming convention to form a combined contextual attribute 169 in which the nearest building is named after the nearest place 167. Likewise, the nearest place 167 can be compared in distance and placement with respect to the intersections which define a block of the arrival location 105. One or more rules can provide special handling when the nearest place 167 is not in the same block as the arrival location 105 (e.g., another nearest place 167 can be used).

Additionally, the contextual rule set 150 can identify spatial relational terms, such as "near", "next" or "within", and some relational terms (e.g., "within") can be used in combination with a distance measurement. The spatial relational terms comprise another portion of the contextual attributes 149 from which the geographic contextual phrase description 158 can be formulated. The spatial relational terms can also include semantic structuring, such as placement of select spatial terms before or after a correspondent contextual attribute 149. Examples also recognize that, with respect to spatial terms or values, the geographic region can vary meaningful expressions and placement of such terms. Accordingly, contextual rule set 150 can select rule sets for spatial relationships based on geographic region.

The CADD 130 can also include a phrase structure component 142 that assimilates the determined contextual attributes (e.g., intersection names 137, nearest building 147, nearest place 167 and/or combined contextual attribute 169) into a cohesive and semantically correct sequence (which can be geographic specific). The phrase structure component 142 can also include templates, filler terms, and other expressions or grammatical rules for structuring the phrase is a sentence or as a comprehensible portion of a sentence.

In this way, the CADD 130 can output the contextual geographic phrase description 158. As shown by an example of FIG. 2, the phrase description 158 can be generated as output by the geographic descriptor system 100 for the human guidance system 10. However, variations, the contextual geographic phrase description 158 can be output for other electronic mediums of the end-user, such as a message to a handset of a driver, rider, or other user.

Methodology

Figure 3:
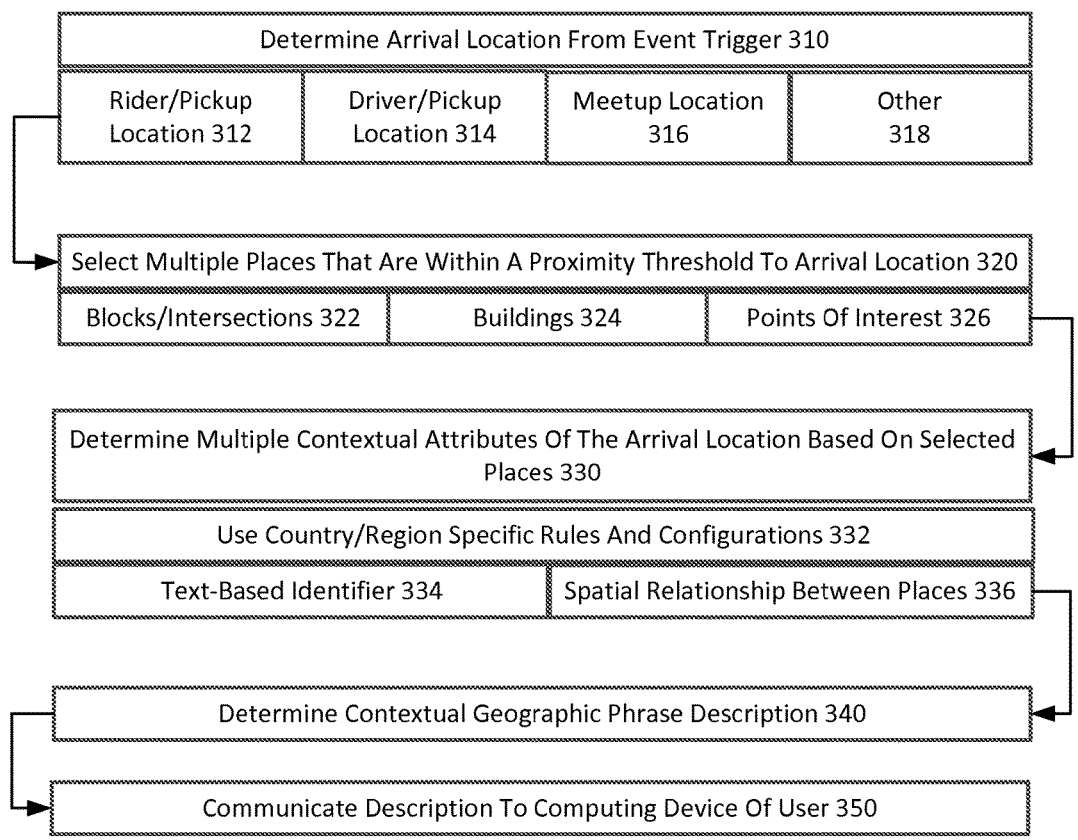
FIG. 3 illustrates an example method for providing geographic contextual description of an arrival location for a computing device.
Figure 4:
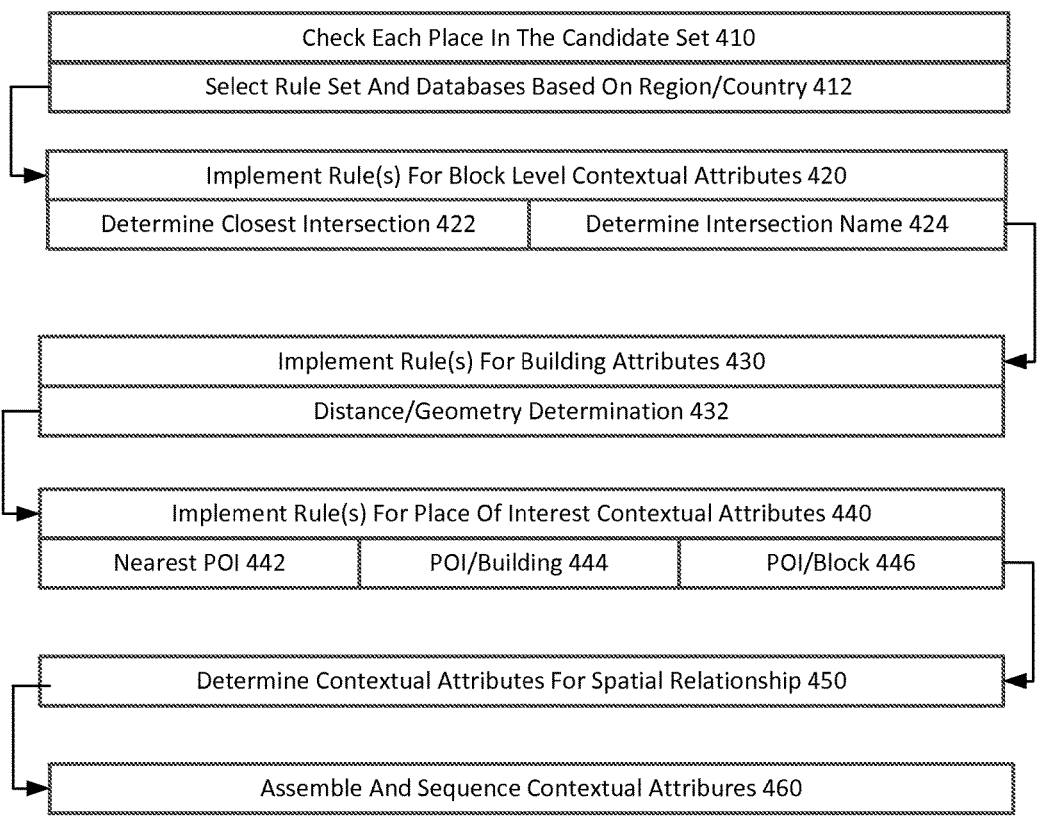
FIG. 4 illustrates an example method for implementing rule-based logic for selecting contextual attributes.

FIG. 3 illustrates an example method for providing a contextual geographic description of an arrival location for a computing device. FIG. 4 illustrates an example method for implementing rule-based logic for selecting contextual attributes. In describing examples of FIG. 3 and FIG. 4, reference may be made to elements of FIG. 2 for purpose of describing suitable components or elements for performing a step or sub step being described.

With reference to FIG. 3, a computer system or device can determine an arrival location from an event trigger (310). An example method of FIG. 3 can be implemented as part of a network service and/or using local resources of the end-user device. Additionally, the output of the contextual geographic phrase description 158 can be provided for different classes of users or entities. In one implementation, the arrival location 105 can be determined from end-user input (312), such as in the form of a "pin drop" on a map interface or other input that identifies the arrival location 105 separately from the rider's current location. In variations, the arrival location 105 can correspond to a suggested pickup location (314). For example, a transport arrangement service or the driver assigned to the transport request can suggest the arrival location, for purposes such as suitability of a vehicle to reach and perform a safe passenger pickup. In such implementations, the geographic descriptor system 100 can generate the geographic contextual phrase description 158 for the rider, in order to facilitate the rider in arriving at the arrival location. Still further, the arrival location 105 can be generated from a process or mufti-user input which results in the selection of a meetup location (316). The designation or identification of an arrival location can be identified for a variety of other applications, using both automated and user-driven events (318).

Based on the arrival location 105, the geographic descriptor system 100 can determine the candidate set of places 129 (320). The candidate set of places 129 can include blocks/intersections (322), buildings (324) and/or places of interest (326).

Once the candidate set is determined, the geographic descriptor system 100 can determine multiple contextual attributes 149 for the arrival location 105 (330). The selected contextual attributes 149 can be based on objective criteria, which includes distance measurements that approximate real-world proximity (rather than map calculation), and further eliminates variables such as subjective selection of visual markers. The contextual rule set 150 can be used to determine a geographic or region specific set of rules (332) which identify text-based identifies (e.g., business names) of places (334) and spatial relationships (336) as contextual attributes. In some examples, the contextual rule set 150 can also sequence contextual attributes for comprehension, and then combine contextual attributes for purpose of naming convention.

The contextual geographic phrase description 158 can be determined from the contextual attributes (340). The description can be generated from semantic rules, collation of the determined contextual attributes 149, templates and other phrase generation mechanisms, in order to generate the contextual geographic phrase description 158.

The contextual geographic phrase description can then be communicated to a computing device of an end user in accordance with the specific implementation or use scenario (350). By way of examples, a user can use contextual graphic phrase description 158 in order to arrive at a pickup location or a meetup location. With respect to meetup location, pickup locations etc., users can do the contextual geographic phrase description 158 and avoid viewing map contents while progressing towards the arrival location. This advantage is especially apparent when street addresses and cities are not visible to the pedestrian or driver. Under conventional approaches, drivers and pedestrians often use map content (e.g., repeatedly stare at mobile devices in order to view GPS and map information) in order to arrive at the arrival location. In contrast, examples as described can communicate the contextual geographic phrase description 158 before the end-user starts progressing towards the arrival location. However, since the contextual geographic phrase description 158 is more comprehensible to the user then street address (which may also be hidden), the user is more likely to remember the information of the phrase description and also to recognize when he or she has arrived at the arrival location 105. In this regard, the user can more readily locate an arrival location without the use of a navigation component, once the contextual geographic phrase description 158 is communicated to the user.

As an addition of variation, the output of the contextual graphic phrase description 158 can be provided to a driver in a variety of context, such as in order to facilitate the driver in visually locating the arrival location 105 when the street address of the arrival location is not sufficient. As another application, the contextual geographic phrase description 158 can be communicated to a handset of one or more drivers during a driver selection process, in order to facilitate the drivers in visually recalling or comprehending the arrival location relative to their current position. With some transport arrangement services, the driver selection process involves assigning drivers to transport requests on a first-to-respond basis, and the contextual graphic phrase description 158 can enable some drivers to use good judgment in arriving at a decision more quickly for accepting/declining the transport request, thereby increasing the likelihood that they will be assigned to the transport request of their choosing. As another example, the contextual graphic phrase description 158 can facilitate the driver in reaching a decision to decline or skip the transport request because the recollection triggered by the phrase description 158 puts the driver on notice as to difficulties which would otherwise not be apparent from a quick glance of map contents or street address. For example, the driver may be aware of street conditions which can hinder pickup, or preclude arrival time in a manner that is not apparent from the map contents.

With reference to an example of FIG. 4, the CADD 130 can operate to determine individual contextual attribute of the candidate set based in part on distance from the arrival location 105 (410). In determining the contextual attributes, the CADD 130 can implement rules or logic otherwise configured for a particular region or country (412).

In one implementation, the rule set can be implemented in a sequential or progressive fashion to determine, as outcome, contextual attributes 149 for the contextual geographic phrase description 158. In one example, the rules can implement determinations to determine block level contextual attributes first (420). The determination of block level contextual attributes can include determining intersections which define a block on which the arrival location 105 is located (422). The determination of block level contextual attributes can also include determining a name for at least the one intersection which is to define the block (424). By way of example, the at least one intersection can correspond to the closest intersection, or the nearest major intersection (e.g., with traffic light). In determining the intersection(s), a distance measurement between the intersection and the arrival location 105 can also be determined.

According to one embodiment, following block-level contextual attributes, rules or other logic are implemented to select contextual attributes for building selection and description (430). The contextual rules can use building geometry (e.g., distance from street) and other parameters to determine the physical distance from the arrival location to the nearest building (432).

Still further, following building-level contextual attributes, rules or other logic are implemented to select contextual attributes for place of interest selection and description (440). In one implementation, the nearest place of interest to the arrival location 105 is selected (442). In one implementation, a determination is made as to whether the nearest place of interest is within the nearest building (444). If the nearest place of interest is within the nearest building, a separate determination can be made from the building geometry data 157 as to whether the place of interest is near or at an exterior of the building. Additionally, a determination can be made as to whether the place of interest is on the same block as the arrival location 105. If the place of interest is on another block, the rule based approach can provide that another place of interest is to be considered in order to augment or replace the prior determined place of interest (446).

With determination of intersections, buildings, and places of interest for contextual attributes, the rules used to establish the determination of the contextual attributes can include or otherwise integrate the determination of contextual attributes which determine the spatial relationship of the arrival location 105 with respect to the individual attributes (450). The rules can, for example, identify terns or expressions which provide geographic context to the relative location of places represented by the selected contextual attributes. These attributes can be relative expressions (e.g., "next to", "near" etc.), quantified expressions ("50 feet from") or combinations thereof ("about 10 feet from").

The determined contextual attributes can be assembled and sequenced for a phrase structure (460). The phrase structure can be integrated with rules or logic for determining the contextual attributes. In variations, some or all aspects of the phrase structure can be determined as a separate step, through processes such as template selection. The resulting contextual geographic phrase description 158 can be generated and output to the user through a variety of mediums, such as a map/navigation interface or as a message. While the example of FIG. 4 describes steps 420-450 in the specified order, in other examples, the rules described in steps 420-450 may be implemented in a different order and/or one or more of the rules may be omitted (e.g., not performed).

Hardware Diagrams

Figure 5:
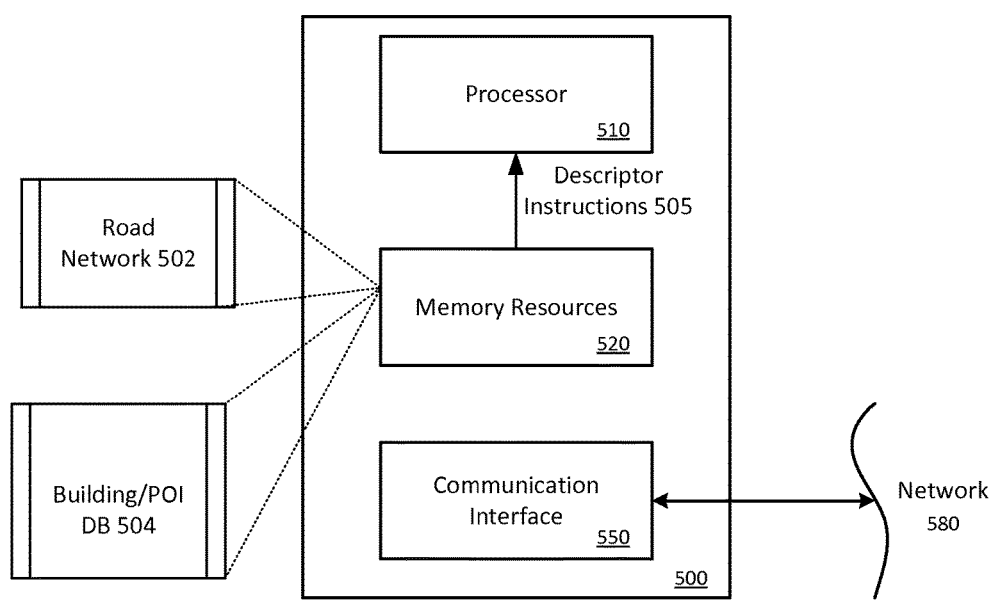
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1 or 2, the geographic descriptor system 100 may be implemented using a computer system such as described by FIG. 5. The geographic descriptor system 100 may also be implemented using a combination of multiple computer systems, such as by way of an independent service or service enhancement (e.g., for transport arrangement services).

In one implementation, a computer system 500 includes processing resources 510, memory resources 520, and communication interface 550. The computer system 500 includes at least one processor 510 for processing information. The memory resources 520 can include a random access memory (RAM) or other dynamic storage device, for storing information and instructions to be executed by the processor 510. The memory resources 520 also may be used for storing temporary variables or other intermediate information during execution of instructions to be executed by the processor 510. The memory resources 520 may also include a read only memory (ROM) or other static storage device for storing static information and instructions for the processor 510. A storage device, such as a magnetic disk or optical disk, is provided for storing information and instructions.

The communication interface 550 can enable the computer system 500 to communicate with one or more networks 580 (e.g., cellular network) through use of the network link (wireless or wireline). Using the network link, the computer system 500 can communicate with one or more computing devices, and one or more servers. In some variations, the computer system 500 can store data stores for determining contextual attributes, including for example, a road network data store 502 and/or a building or point of interest store 504. The memory resources 520 can store the data stores, as well as instructions 505 for implementing the geographic descriptor system 100, as described with other examples.

The computer system 500 can also include a display device, such as a cathode ray tube (CRT), an LCD monitor, or a television set, for example, for displaying graphics and information to a user. An input mechanism, such as a keyboard that includes alphanumeric keys and other keys, can be coupled to computer system 500 for communicating information and command selections to the processor 510. Other non-limiting, illustrative examples of input mechanisms include a mouse, a trackball, touch-sensitive screen, or cursor direction keys for communicating direction information and command selections to the processor 510 and for controlling cursor movement on the display.

Examples described herein are related to the use of the computer system 500 for implementing the techniques described herein. According to one embodiment, those techniques are performed by the computer system 500 in response to the processor 510 executing one or more sequences of one or more instructions contained in the memory resources 520. Such instructions may be read into the memory resources 520 from another machine-readable medium, such as storage device. Execution of the sequences of instructions contained in the memory resources causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is being claimed is:

1. A method for providing a contextual description of a location to a user, the method comprising:
   performing, using one or more processors, steps comprising:
   (a) determining an arrival location from an event trigger, the arrival location being identified by geographic coordinates;
   (b) selecting multiple places that are within a proximity threshold with respect to the arrival location based on the geographic coordinates of the arrival location;
   (c) determining multiple contextual attributes of the arrival location based on the selected multiple places;
   (d) determining a contextual description for the arrival location, the contextual description being based in part on individual or combined contextual attributes, each individual or combined contextual attribute including (i) a text-based identifier of one or more of the multiple places, and (ii) a spatial relationship as between one or more of the places, or as between the multiple places and the arrival location; and
   (e) providing the contextual description to a computing device that is operated by the user, to guide the user in traveling from a current location to the arrival location.

2. The method of claim 1, wherein (a) includes detecting a user pointer input on a map interface, and then identifying the geographic coordinates of the arrival location based in part on the user pointer.

3. The method of claim 1, wherein (a) includes receiving a current location from the user, and selecting the arrival location for the user based on the current location, the arrival location being measurably different from the current location.

4. The method of claim 1, wherein the spatial relationship includes an expression of proximity or orientation.

5. The method of claim 1, wherein performing the steps comprises performing (a) through (e) based on a classification of the user.

6. The method of claim 5, wherein the classification of the user includes one of passenger or driver.

7. The method of claim 1, wherein the multiple places includes multiple places selected (i) a block which contains the arrival location, (ii) one or more intersections to define the block, (iii) one or more buildings within the block, and (iv) one or more points of interest which is within the proximity threshold.

8. The method of claim 1, wherein (c) includes determining an intersection name for each of the one or more intersections, the intersection name being determined from a set of rules.

9. The method of claim 1, wherein (c) includes determining one of the multiple contextual attributes to be a nearest building.

10. The method of claim 1, wherein performing the steps comprises performing (a) through (e) based on logical configurations that are specific to a region or country.

11. A method for providing a contextual description of a location to a user, the method comprising:
   performing, using one or more processors, steps comprising:
   (a) determining an arrival location from an event trigger, the arrival location being identified by geographic coordinates;
   (b) selecting multiple places that are within a proximity threshold with respect to the arrival location based on the geographic coordinates of the arrival location;
   (c) determining multiple contextual attributes of the arrival location based on the selected multiple places, the multiple contextual attributes including a point of interest within a nearest building, an indicator of whether the point of interest is likely visible or apparent from a street based on a distance from the point of interest to the arrival location, and a combination of the point of interest and the nearest building;
   (d) determining a contextual description for the arrival location, the contextual description being based in part on individual or combined contextual attributes, each individual or combined contextual attribute including (i) a text-based identifier of one or more of the multiple places, and (ii) a spatial relationship as between one or more of the places, or as between the multiple places and the arrival location; and
   (e) providing the contextual description to a computing device that is operated by the user, to guide the user in traveling from a current location to the arrival location.

12. The method of claim 11, wherein (c) includes cross-referencing the geographic location with a database of buildings and building geometries and with a database of business addresses in order to determine (i) the nearest building and (ii) a business that is likely visible or apparent from the street.

13. A computer system comprising:
   a memory to store a set of instructions;
   a processor to use the set of instructions to:
   identify an arrival location using a set of geographic coordinates;
   determine, from the set of geographic coordinates, multiple places which are within a threshold distance of the arrival location, the multiple places including a block, one or more intersections that define the block, a set of one or more buildings, and a set of one or more point of interests;
   determine multiple contextual attributes of the arrival location based on selected multiple places;
   determine a contextual description for the arrival location, the contextual description being based in part on individual or combined contextual attributes, each individual or combined contextual attribute including (i) a text-based identifier of one or more of the multiple places, and (ii) a spatial relationship as between one or more of the places, or as between the multiple places and the arrival location; and
   provide the contextual description to a navigation interface of a computing device that is operated by a user, to guide the user in travelling from a current location to the arrival location.

14. The computer system of claim 13, wherein one or more of the processors generate the contextual description of the arrival location by including one or more expressions that define a spatial relationship of the at least one point of interest and at least one of the block or the nearest building.

15. The computer system of claim 13, wherein the one or more processors determine whether the at least one point of interest is within the nearest building, and when the at least one point of interest is within the nearest building, the one or more processors generate the contextual description to include a descriptor that provides the at least one point of interest as an informal building name for the nearest building.

16. The computer system of claim 13, wherein the memory stores a key value store which identifies individual blocks, buildings, and points of interest within a given geographic region, and wherein the one or more processors determine the set of multiple places using the key value store.

17. The computer system of claim 13, wherein the one or more processors generate the contextual description in accordance with one or more rules of a region or country.

18. The computer system of claim 13, wherein the one or more processors suggest the arrival location to the user in response to a user's current location.

19. The computer system of claim 13, wherein the one or more processors communicate the arrival location to a provider when querying one or more providers for assignment to a location specific service request at the arrival location.

20. A non-transitory computer-readable medium that stores instructions comprising:
   instructions, which are executable by one or more processors to cause the one or more processors to perform operations comprising:
   (a) determining an arrival location from an event trigger, the arrival location being identified by geographic coordinates;
   (b) selecting multiple places that are within a proximity threshold with respect to the arrival location based on the geographic coordinates of the arrival location;
   (c) determining multiple contextual attributes of the arrival location based on the selected multiple places;

(d) determining a contextual description for the arrival location, the contextual description being based in part on individual or combined contextual attributes, each individual or combined contextual attribute including (i) a text-based identifier of one or more of the multiple places, and (ii) a spatial relationship as between one or more of the places, or as between the multiple places and the arrival location; and (e) providing the contextual description to a navigation interface of a computing device that is operated by the user, to guide the user in travelling from a current location to the arrival location.

\* \* \* \* \*